US008826634B2

(12) United States Patent
Landry, Jr.

(10) Patent No.: US 8,826,634 B2
(45) Date of Patent: Sep. 9, 2014

(54) METHOD AND APPARATUS FOR CUTTING AQUATIC VEGETATION

(71) Applicant: Stephen Landry, Jr., Franklin, LA (US)

(72) Inventor: Stephen Landry, Jr., Franklin, LA (US)

( * ) Notice: Subject to any disclaimer, the term of this patent is extended or adjusted under 35 U.S.C. 154(b) by 0 days.

(21) Appl. No.: 13/720,190

(22) Filed: Dec. 19, 2012

(65) Prior Publication Data
US 2013/0152533 A1 Jun. 20, 2013

Related U.S. Application Data

(60) Provisional application No. 61/577,723, filed on Dec. 20, 2011.

(51) Int. Cl.
A01D 44/00 (2006.01)

(52) U.S. Cl.
CPC .................................... A01D 44/00 (2013.01)
USPC ................................................................ 56/8

(58) Field of Classification Search
USPC .................... 56/8, 255, 295, 249; 144/34.1
See application file for complete search history.

(56) References Cited

U.S. PATENT DOCUMENTS

| 1,200,096 | A | * | 10/1916 | Firman | 56/8 |
| 1,392,900 | A | * | 10/1921 | Ambrose | 56/8 |
| 2,630,665 | A | * | 3/1953 | Lauer | 56/10.1 |
| 2,651,905 | A | * | 9/1953 | Schlueter | 56/255 |
| 2,677,926 | A | * | 5/1954 | Washbourne et al. | 56/8 |
| 3,140,575 | A | * | 7/1964 | Ott et al. | 56/295 |
| 3,217,812 | A | * | 11/1965 | Gallion | 172/16 |
| 3,246,460 | A | * | 4/1966 | Patterson et al. | 56/235 |
| 3,415,047 | A | * | 12/1968 | Blecke | 56/295 |
| 3,500,622 | A | * | 3/1970 | Bowen | 56/295 |
| 3,540,198 | A | * | 11/1970 | Erickson et al. | 56/295 |
| 3,835,630 | A | * | 9/1974 | von der Au | 56/295 |
| 3,894,385 | A | * | 7/1975 | Brown, Jr. | 56/295 |
| 4,196,566 | A | * | 4/1980 | Donnelley | 56/8 |
| 4,199,922 | A | * | 4/1980 | van der Lely | 56/13.6 |
| 4,696,149 | A | * | 9/1987 | Hawk | 56/8 |
| 5,361,570 | A | * | 11/1994 | Bernardy | 56/255 |
| 5,475,970 | A | | 12/1995 | Landry, Jr. | |
| 5,651,243 | A | * | 7/1997 | Arnold et al. | 56/94 |
| 6,250,056 | B1 | * | 6/2001 | Spagnolo | 56/235 |
| 6,449,931 | B1 | * | 9/2002 | Penny et al. | 56/8 |
| 6,647,704 | B2 | * | 11/2003 | Penny et al. | 56/8 |
| 6,698,176 | B2 | * | 3/2004 | Scott | 56/235 |
| 7,171,798 | B1 | * | 2/2007 | Bernardy | 56/295 |
| 2002/0095921 | A1 | * | 7/2002 | Penny | 56/8 |
| 2005/0229572 | A1 | * | 10/2005 | Dairon et al. | 56/255 |
| 2006/0162309 | A1 | * | 7/2006 | Schloesser | 56/255 |

* cited by examiner

Primary Examiner — Thomas B Will
Assistant Examiner — Joan D Misa
(74) Attorney, Agent, or Firm — Ted M. Anthony

(57) ABSTRACT

An aquatic vegetation cutter adaptable to a bow of a vessel having rotatable, cultivator-type cutter disks on converging angles along each side of the bow, and extending partially below the water line. Smaller ancillary cutter disks are mounted to the leading face of the larger cultivator-type cutter disks. The larger cutter disks and smaller ancillary cutter disks are driven using at least one drive motor, a series of drive sprockets and a connecting drive chain.

7 Claims, 6 Drawing Sheets

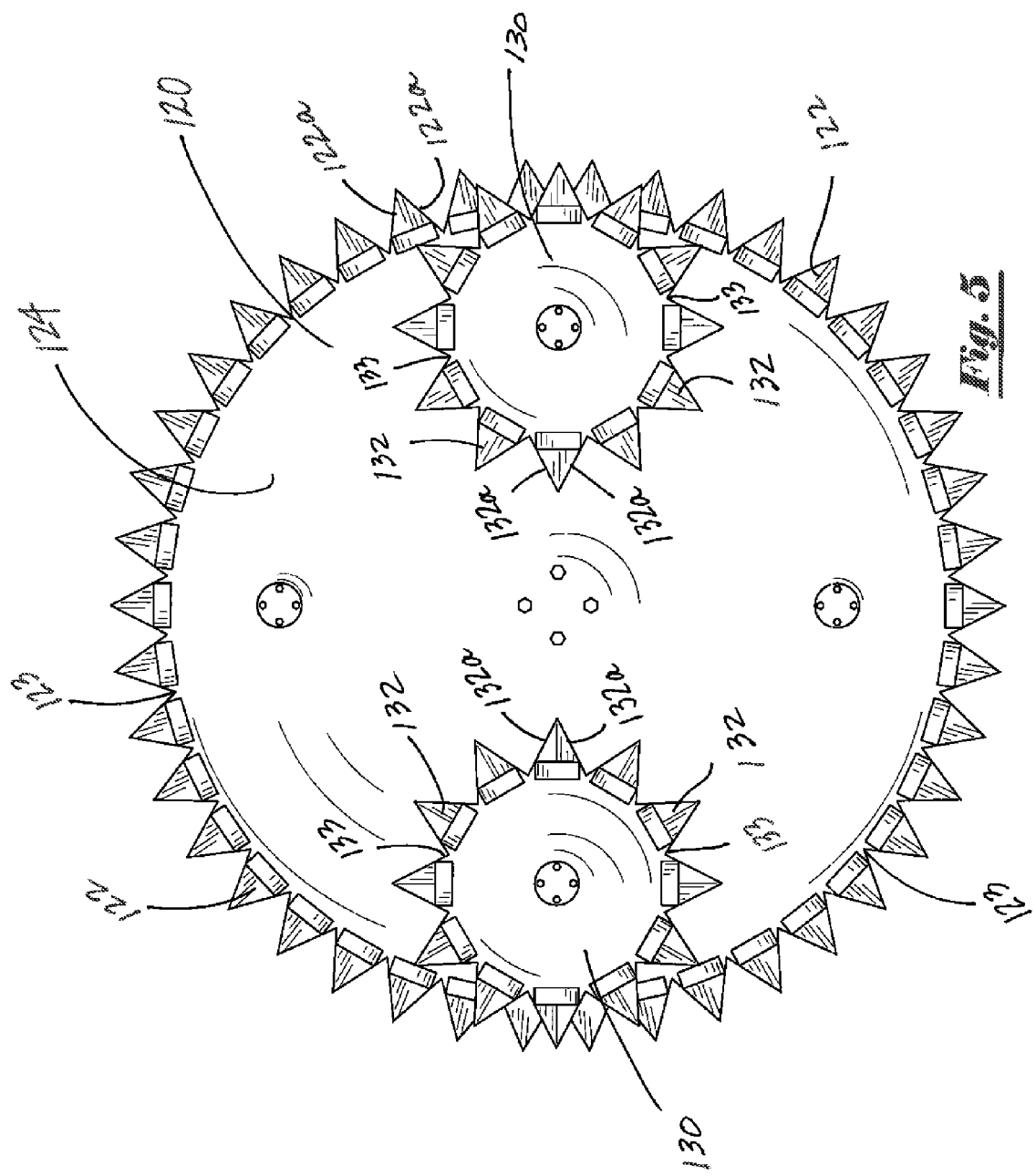

US 8,826,634 B2

METHOD AND APPARATUS FOR CUTTING AQUATIC VEGETATION

CROSS REFERENCES TO RELATED APPLICATION

Priority of U.S. provisional patent application Ser. No. 61/577,723, filed Dec. 20, 2011, incorporated herein by reference, is hereby claimed.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention relates to the cutting, but not the harvesting, of aquatic vegetation. More particularly, the present invention pertains to the near-surface cutting and/or separation of aquatic vegetation to allow for passage of a boat or other vessel.

2. Brief Description of the Prior Art

Aquatic vegetation including, without limitation, lily pads and water grass, frequently grow in abundance in relatively shallow, slow moving streams and backwater marsh. Such aquatic vegetation can present numerous problems for boaters and/or others attempting to navigate such water bodies. For example, such aquatic vegetation can be especially problematic for commercial crawfishermen, wildlife and game officials, utility workers and oil and gas industry personnel who must gain access to remote wetland locations.

Aquatic vegetation is becoming more of a problem as a result of restrictions being placed on chemicals used for eradication. Such vegetation often becomes so thick that boat travel becomes impossible. Even air boats have trouble with lily pads which have a tendency to mound up under the boat.

Various aquatic vegetation cutters such as mowers and harvesters have been developed for collecting and cutting vegetation from underwater, but have proven to be largely ineffective when used on aquatic vegetation at, near or above the surface of the water. Weed cutters for attachment to boat motors have been developed but have also proven to be largely ineffective with regard to floating vegetation such as lily pads. Even when such vegetation cutters are used, the loose vegetation is frequently sucked into the intake(s) of a boat's motor, frequently causing such motor to stall.

Aquatic vegetation is becoming more of a problem as a result of restrictions being placed on chemicals used for eradication. Even when such chemicals can be used, aquatic vegetation frequently grows back more aggressively when such chemicals are used up or dissipated. Aquatic vegetation can become so thick that boat travel becomes impossible. Even air boats have trouble with lily pads and other aquatic vegetation which have a tendency to mound up under the boats.

Thus, there is a need for a cutting apparatus that overcomes problems currently associated with boat travel through aquatic vegetation. The apparatus should be capable of being beneficially mounted at or near the bow of a boat or other floating vessel to permit such cutting/shredding at the leading edge of said boat or vessel. The cutting apparatus should cut such aquatic vegetation at or near the surface of a water body and at least partially shred the cut vegetation into relatively smaller pieces in order to clear a path through such aquatic vegetation.

SUMMARY OF THE PRESENT INVENTION

The present invention comprises an apparatus having a plurality of relatively large rotatable disks (generally similar in design to agricultural cultivating disks) having cutting elements disposed on said disks. In the preferred embodiment, said disks can each have a concave shape, and are positioned at a predetermined angle/orientation relative to each other. The cutting apparatus of the present invention operates by slicing aquatic vegetation at or near the surface of a body of water, and in some cases above the water surface, at least partially shredding such cut vegetation, and thereafter directing the debris toward either side of the vessel. In this manner, the present invention serves to clear a path through such aquatic vegetation, and prevents such vegetation from fouling a vessel's propulsion engine. Further, cut vegetation that is shredded or chopped into smaller pieces can also decompose or biodegrade more quickly than larger pieces.

In the preferred embodiment, the cutting disks of the present invention are mounted to the bow of a boat using a pivotal mounting bracket. Such disks are oriented with at least one disk substantially parallel to each side of a boat's bow and nearly intersecting at a point slightly ahead of the boat's bow. The disks can be at least partially submerged into the water when cutting of aquatic vegetation is desired, or selectively positioned above the water surface, particularly when not in use (thus preventing drag). Adjustment means are provided for setting the desired height of the disks with respect to the boat's water line and conformance to the bow configuration.

The disks may also be fitted with triangular serrated cutting blades around their perimeter to provide a more positive cutting action. In one embodiment, the disks are free to rotate when in the lowered working position as a result of frictional drag by water and aquatic vegetation. Such rotation causes the cutting blades to slice through even the toughest vegetation. The relatively large cutting disks, on the average of approximately 30 inches, and their dished shape, at least partially shred or chop the cut vegetation thus clearing a path for a vessel's propulsion motor. The disks may also be power driven, thus permitting reverse operation in order to clear any vegetation build-up on said disks.

In the preferred embodiment, at least one smaller disk is disposed on the outer cutting surface of the larger rotatable disks. A drive mechanism provides power to the large disks, as well as small disks disposed thereon. With the application of multiple disks, a vessel can cut a substantial swath of aquatic vegetation while still maintaining a reasonable speed, thus clearing a path for other vessels.

The cutting disks of the present invention have proven to be a distinct advantage to vessel operators by providing an early warning of obstacles in a vessel's path which may be covered or obscured by vegetation. The disks, upon contact with such an obstacle, prevent further encounter by the vessel thus allowing the vessel operator to seek other avenues without damage to the vessel's hull. When the cutting disks of the present invention are powered, reversing the disk rotation can propel a vessel away from the obstacle. In certain circumstances, the cutting disks may be used to assist in propelling the boat, including in reverse.

An object of the present invention is to provide a cutting apparatus which can be adapted to pivotally mount to the bow of a vessel. Such cutting apparatus can be pivotally lowered to a prescribed water depth (including, without limitation, above the water surface), thereby allowing the cutting apparatus to cut and shred/chop in the path of said vessel aquatic vegetation.

Another object of the present invention is to provide an apparatus which cuts the vegetation in its path and moves it to each side of a vessel's hull thus allowing the vessel (and any following vessels) to pass without drawing the vegetation into the boat's propulsion system.

Still another object of the present invention is to prevent banking of aquatic vegetation under a vessel in such a manner that a vessel must attempt to ride up and over the mass, thus entangling the vessel's propulsion drive.

Yet another object of the present invention is to provide an aquatic vegetation separating device having two or more cultivator disks which can be power driven thus clearing a wide swath of vegetation with each pass, thereby clearing streams and canals for small craft.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed.

FIG. 5 depicts an alternative embodiment of a cutting disk assembly of the present invention.

DETAILED DESCRIPTION OF A PREFERRED EMBODIMENT OF THE INVENTION

Figure 1:
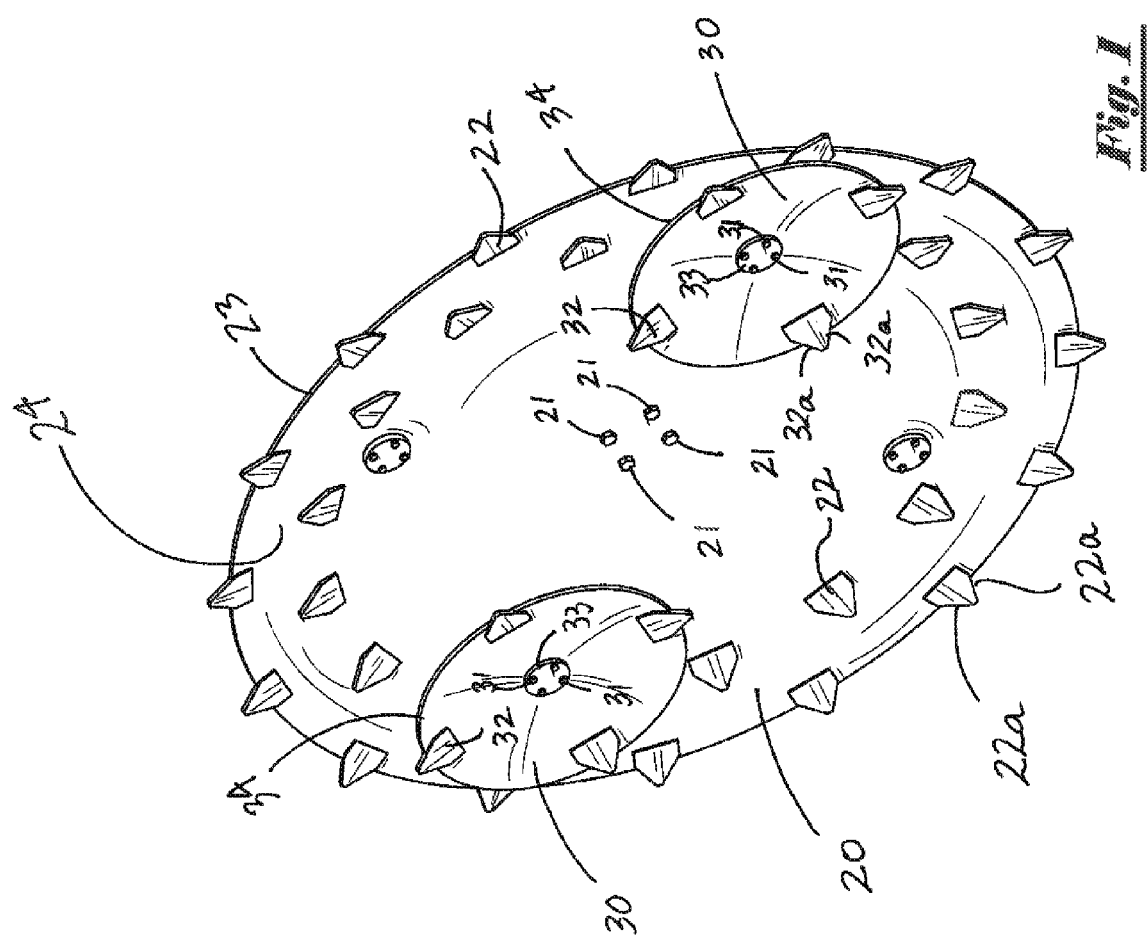
FIG. 1 depicts a perspective view of a cutting disk assembly of the present invention.

FIG. 1 depicts a perspective view of a cutter disk 20 of the present invention. As depicted in FIG. 1, cutter disk 20 comprises a relatively large, substantially circular and rotatable cutter disk 20 (generally similar in design to a conventional agricultural cultivating disk) mounted to a mounting assembly (described below) using fasteners 21. Cutter disk 20 is rotatable around its central axis. In the preferred embodiment, rotatable cutter disk 20 has outer circumferential edge 23 and forward-facing surface 24 defining a gentle concave shape.

A plurality of substantially triangular cutting blades 22 having angled cutting surfaces 22a are beneficially disposed on said forward-facing surface 24 of cutting disk 20. Although the number and placement of said cutting blades 22 can be adjusted for specific applications, in most instances a plurality of cutting blades 22 will be positioned such that a portion of said cutting blades 22 extend beyond outer edge 23 of disk 20.

In the preferred embodiment, cutter disk 20 is relatively large, having a diameter of approximately 30 inches; however, it is to be observed that the dimensions of cutting disk 20 (and cutting blades 22) can be adjusted to fit particular uses or applications. At least one ancillary cutter disk 30, typically having a smaller diameter than cutting disk 20, is disposed on forward facing cutting surface 24 of the cutter disk 20. Said ancillary cutter disks 30 can have a concave shape (similar to the concave shape of larger cutter disk 20), and are capable of rotating independently from the rotation of cutter disk 20. A plurality of substantially triangular cutting blades 32 having angled cutting surfaces 32a are beneficially disposed on said ancillary cutting disks 30. Although the number and placement of said cutting blades 32 can be adjusted for specific applications, in most instances a plurality of cutting blades 32 will be positioned such that a portion of said cutting blades 32 extend beyond outer edge 34 of each disk 30.

Figure 2:
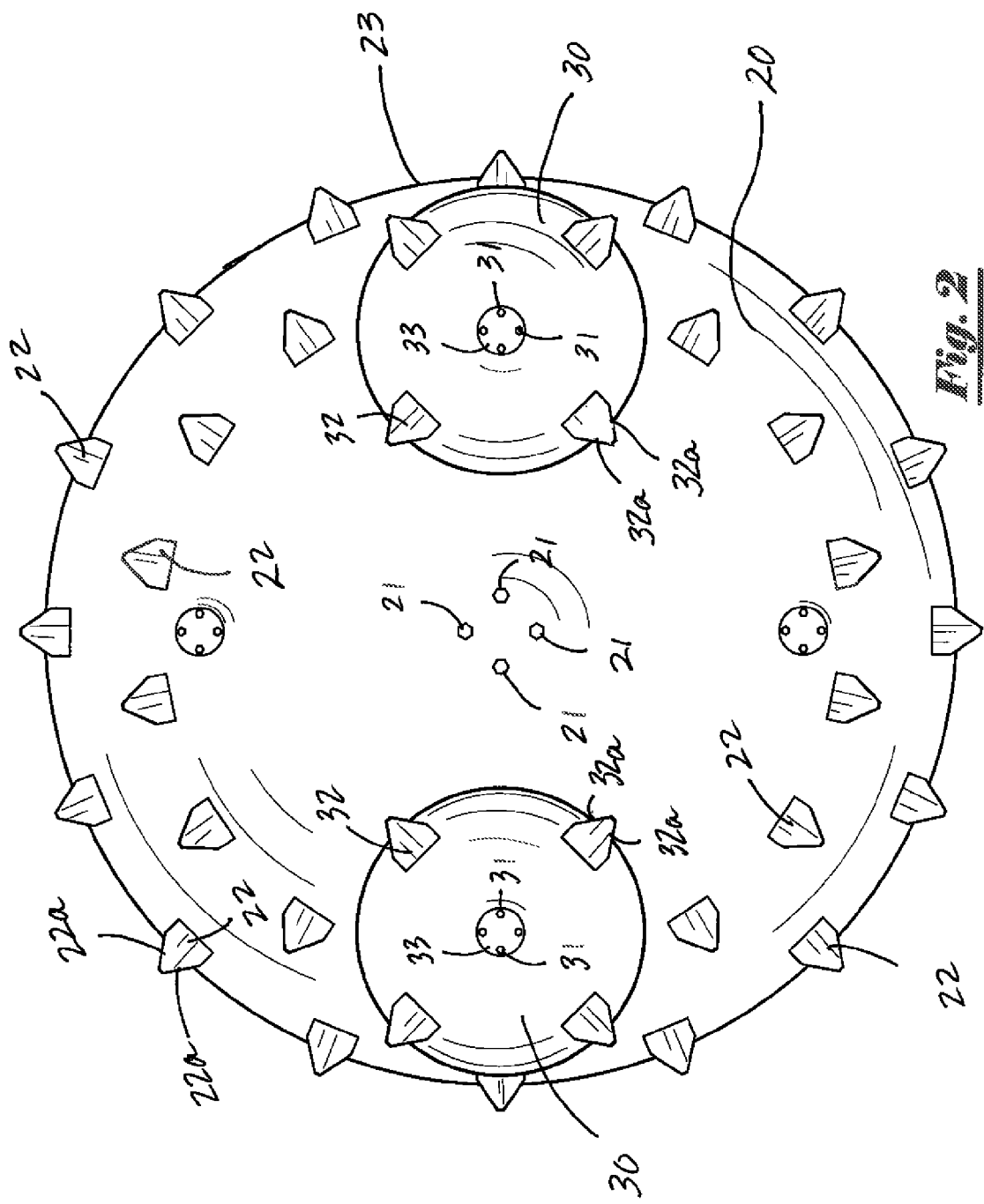
FIG. 2 depicts a front view of a cutting disk assembly of the present invention.

FIG. 2 depicts a front view of a cutter disk 20 of the present invention. Cutter disk 20 comprises a relatively large, substantially circular and rotatable cutter disk 20 having outer circumferential edge 23 and forward surface 24 defining a gentle concave shape. A plurality of substantially triangular cutting blades 22 having angled cutting surfaces 22a are beneficially disposed on said forward-facing surface 24 of cutting disk 20. In the embodiment depicted in FIG. 2, a plurality of cutting blades 22 are positioned such that a portion of said cutting blades 22 extend beyond outer edge 23 of disk 20. Disk 20 is mounted using fasteners 21.

Ancillary cutter disks 30, typically having a smaller diameter than cutter disk 20, are disposed on forward facing cutting surface 24 of cutter disk 20. Said ancillary cutter disks 30 can have a gentle concave shape, and are capable of rotating independently from the rotation of cutter disk 20. A plurality of substantially triangular cutting blades 32 having angled cutting surfaces 32a are beneficially disposed on said ancillary cutting disks 30. In the embodiment depicted in FIG. 2, a plurality of cutting blades 32 are positioned such that a portion of said cutting blades 32 extend beyond outer edge 34 of each disk 30.

Figure 3:
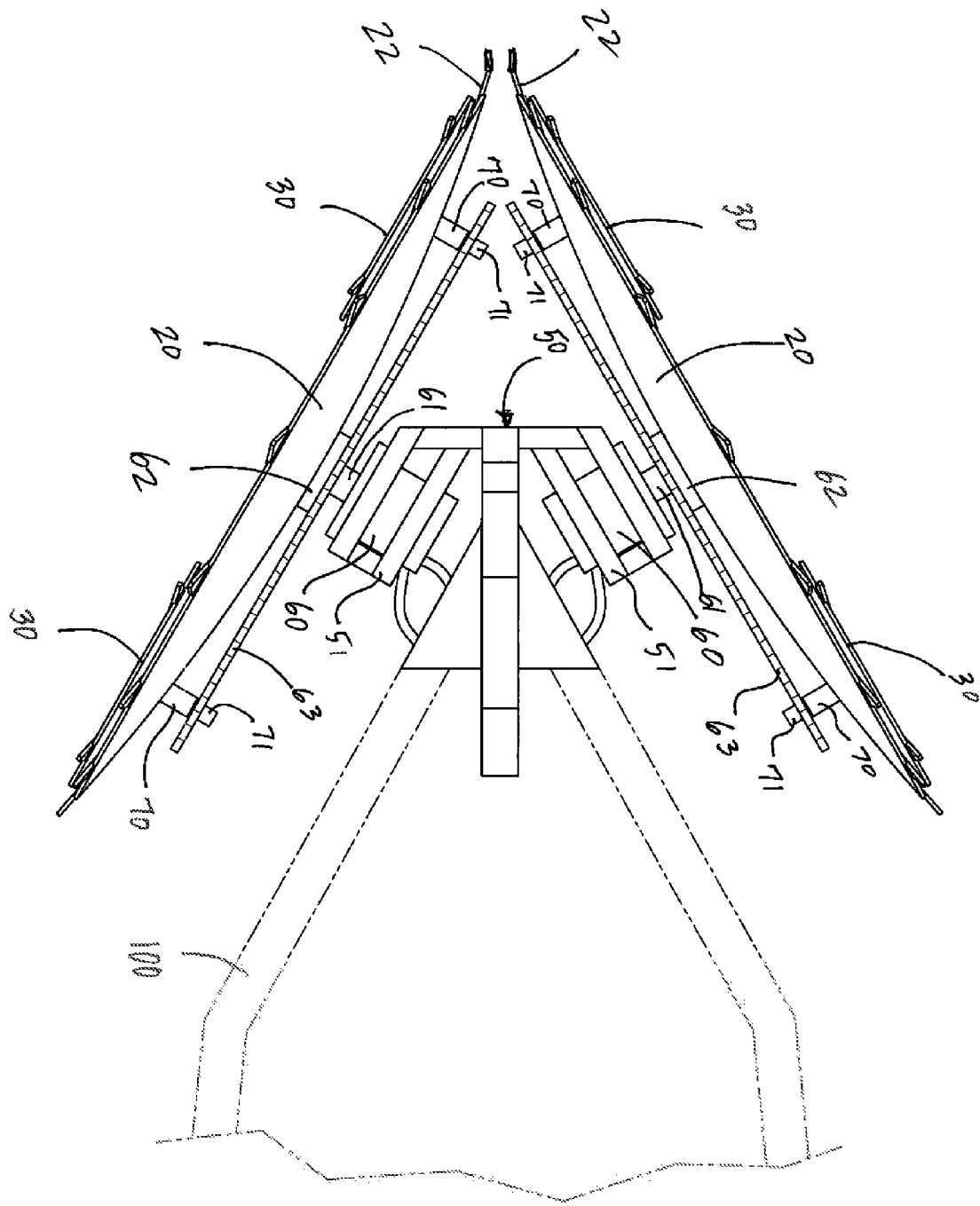
FIG. 3 depicts an overhead view of the aquatic vegetation cutting assembly of the present invention.

FIG. 3 depicts an overhead view of the aquatic vegetation cutting assembly of the present invention mounted for use on a vessel 100. In the preferred embodiment, a plurality of cutter disks 20 of the present invention is mounted to the bow of a boat using pivotal mounting assembly 50. As depicted in FIG. 3, cutting disks 20 are mounted in opposing orientation; at least one cutter disk 20 is positioned substantially parallel to each side of the bow of vessel 100, with said cutter disks 20 oriented in a converging angle. Although said cutter disks 20 do not intersect, the leading edges of said cutter disks 20 are positioned in close proximity to each other at a point slightly ahead of the bow of vessel 100.

In the preferred embodiment, blade members 22 of opposing cutter disks 20 do not intersect or overlap. Further, said blade members 22 can be beneficially angled so that the inner side of said blade members form an obtuse angle, in order to ensure that said opposing blade members do not overlap with each other while cutter disks 20 are rotating. With the use of multiple cutting disks 20, vessel 100 can cut a substantial swath of aquatic vegetation while still maintaining a reasonable speed, while also clearing a path for other trailing vessels.

In the embodiment depicted in FIG. 3, drive mechanism provides power to cutter disks 20, as well as ancillary cutter disks 30 disposed on said large cutter disks 20. Specifically, said drive mechanism includes tandem motors 60 mounted within motor mounts 51 of mounting assembly 50. Motors 60, each having a drive shaft 61, are oriented facing outward from the bow of vessel 100. Each drive shaft 61 is connected to a central drive sprocket 64 (not shown in FIG. 3) and central hub 62. Each of said central hubs 62 is in turn connected to a cutter disk 20. Ancillary cutter disks 30 are rotatably connected to cutter disks 20 via ancillary disk drive shafts 71 and ancillary disk hubs 70. Drive chain 63 is received on ancillary drive sprockets 72 and central drive sprocket 64 (not shown in FIG. 3).

Figure 4:
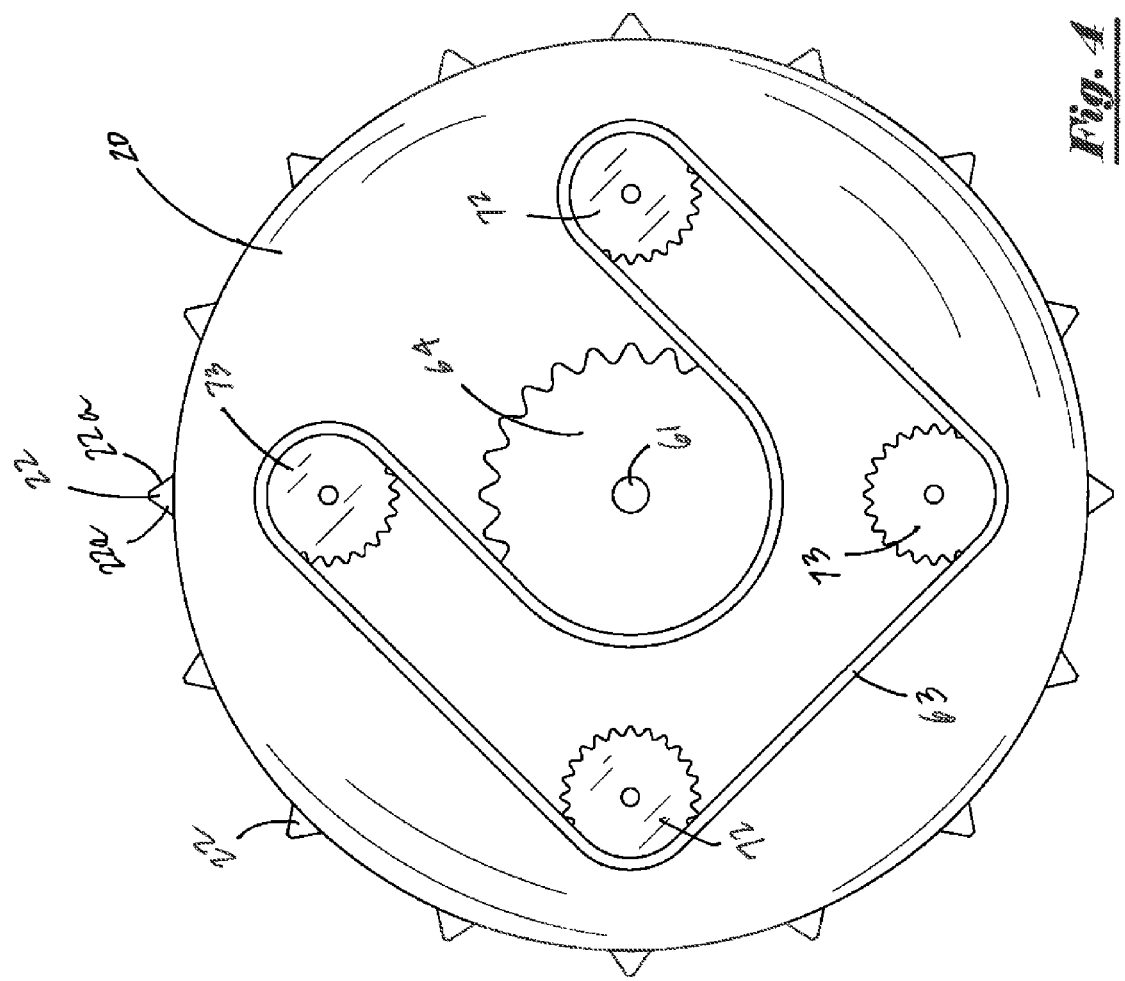
FIG. 4 depicts a rear view of a cutting disk assembly of the present invention.

FIG. 4 depicts a rear view of a cutting disk 20 of the present invention including elements of the drive mechanism for said cutting disk 20 and associated ancillary cutting disks 30. Motor drive shaft 61 is received within the central bore of central drive sprocket 64. Similarly, ancillary drive shafts 71 are received within the central bore of ancillary disk drive sprockets 72 having teeth. Idler sprockets 73 having teeth are disposed on the rear surface of cutter disk 20. Drive chain 63 is received on the teeth of central drive sprocket 64, ancillary disk drive sprockets 72 and idler sprockets 73; torque applied to drive shaft 61 (via a drive motor 60, as depicted in FIG. 3) causes rotation of cutter disk 20. Drive chain 63 transfers such torque to ancillary drive sprockets 72 and idler sprockets 73, causing ancillary cutter disks 30 on forward-facing surface 24 of cutter disk 20 to also rotate. An enclosed gear box may be designed specifically for use in this application. Any suitable drive means may be used for this purpose (that is, powering drive motors 60) including but not limited to, hydraulic, air and electric power systems well known to those having ordinary skill in the art.

FIG. 5 depicts an alternative embodiment cutting disk assembly of the present invention. Cutter disk 120 comprises a relatively large, substantially circular and rotatable cutter disk 120 having forward surface 124 defining a gentle concave shape. A plurality of substantially triangular cutting blades 122 having angled cutting surfaces 122a are beneficially disposed on said forward-facing surface 124 of cutting disk 120. In the embodiment depicted in FIG. 5, a plurality of cutting blades 122 are positioned such that a portion of said cutting blades 122 extend beyond the outer peripheral edge surface of disk 120. Further, cutter disk 120 is "notched" in areas 123 between said cutting blades 122.

Ancillary cutter disks 130 are disposed on forward facing cutting surface 124 of cutter disk 120. Said ancillary cutter disks 130 can also have a gentle concave shape, and are capable of rotating independently from the rotation of cutter disk 120. A plurality of substantially triangular cutting blades 132 having angled cutting surfaces 132a are beneficially disposed on said ancillary cutting disks 130. In the embodiment depicted in FIG. 5, a plurality of cutting blades 132 are positioned such that a portion of said cutting blades 132 extend beyond the outer peripheral edge surface of each disk 130. Further, each ancillary cutting disk 130 is "notched" in areas 133 between said cutting blades 132.

Although the alternative apparatus depicted in FIG. 5 can be motor-driven, it is to be observed that said alternative apparatus can be used without a motor drive assembly. In such cases, said alternative embodiment disk(s) 120 and 130 rotate within the water when a vessel is propelled forward in the water. In such instances, disk(s) 120 and 130 can have a larger number of cutting elements 122 and 132, respectively, than motor-driven disks (such as, for example, disks 20 and 30 depicted in FIGS. 1 and 2), as well as a less aggressive angle than such motor-driven disks.

Figure 7:
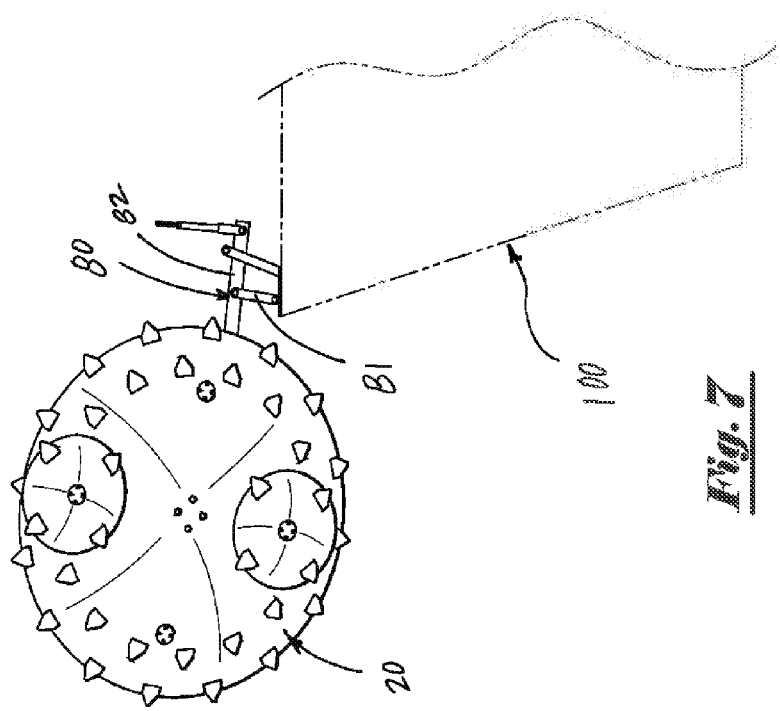
FIG. 7 depicts a side view of a cutting disk assembly of the present invention in a raised position.
Figure 6:
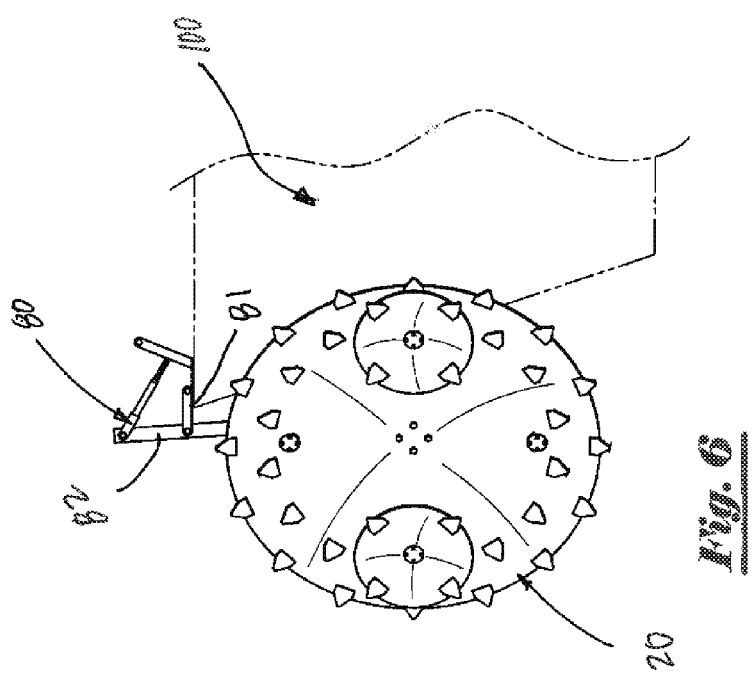
FIG. 6 depicts a side view of a cutting disk assembly of the present invention in a lowered working position.

FIG. 6 depicts a side view of a cutter disk 20 of the present invention in a lowered working position, while FIG. 7 depicts a side view of said cutter disk 20 of the present invention in a raised position. Mounting bracket assembly 80 is connected at or near the bow of vessel 100. As depicted in FIGS. 6 and 7, mounting bracket assembly 80 further comprises a toggle link 81 pivotally attached near one end of a main support member 82. Cutter disks 20 are connected to one end of said main support member 82.

Angular adjustment of the main support member 82 relative to bow angle of vessel 100 is achieved by applying desired force to mounting assembly 30. An optional bifurcated member, attached near the lower end of the main support member 82, can be provided to ensure central alignment and back-up support for the main support member 82 against the hull of vessel 100.

The cupped or concave shape of cutter disks 20 and ancillary cutter disks 30 serves to move cut vegetation away from vessel 100 as said vessel passes. It should be noted that said cutter disks may be made from any suitable material. However, it has been found that ultra high density polymer material can be used, particularly for ancillary cutter disks 30, thereby reducing weight significantly. Although metal can be used to construct cutter disks 20, in such instances a hydraulic lifting apparatus is usually employed due to the increased weight of said disks. It is to be observed that multiple sets of cutter disks may be employed on larger boats to clear canals and navigable streams.

Operation of the aquatic vegetation cutter of the present invention is achieved by pressing down on the main support member 82; lowering the support member 82 by thrusting the support member 82 forward thus allowing toggle link 81 to pivot into a horizontal position, allowing the support member 82 to shift into the vertical position. Forward movement of vessel 100 forces large cutter disks 20 and ancillary cutter disks 30 into contact with marine vegetation. Cutter disks 20 and ancillary cutter disks 30 can be at least partially submerged into the water when cutting of aquatic vegetation is desired, or selectively positioned above the water surface when not in use (thus preventing drag). Adjustment is provided for setting the proper height of the disks with respect to the boat's water line and conformance to the bow configuration.

The disks' respective rotation cuts the vegetation, and separates it along each side of vessel 100. The cutting apparatus of the present invention operates by slicing aquatic vegetation at or near the surface of a body of water, at least partially shredding such cut vegetation, and thereafter directing the debris toward either side of the vessel. In this manner, the present invention serves to clear a path through such aquatic vegetation, and prevents such vegetation from fouling a vessel's propulsion engine.

The cutting disks of the present invention have proven to be a distinct advantage to vessel operators by providing an early warning of obstacles in the vessel's path which may be covered or obscured by vegetation. The disks, upon contact with such an obstacle, prevent further encounter by the vessel thus allowing the vessel operator to seek other avenues without damage to the vessel's hull. When the cutting disks of the present invention are powered, reversing the disk rotation propels the boat away from the obstacle. In certain circumstances, the cutting disks may be used to assist in propelling the boat.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A cutting apparatus mounted to a vessel for cutting aquatic vegetation thereby opening a path for a vessel to pass comprising:
   a) a primary cutting disk assembly mounted to said vessel, wherein said primary cutting disk assembly comprises:
      i) a primary cutting disk having a front side and a back side and at least one bore extending through said disk;
      ii) a sprocket attached to said back side of said primary cutting disk;
   b) at least one ancillary cutting disk assembly rotatably mounted to said primary cutting disk, wherein each of said at least one ancillary cutting disk assembly comprises:
      i) an ancillary cutting disk having a front side and a back side, wherein said ancillary cutting disk does not extend beyond the outer circumference of said primary cutting disk;
      ii) a shaft extending from the back side of said ancillary cutting disks, wherein said shaft is rotatably received within said at least one bore extending through said primary cutting disk;
      iii) a sprocket attached to said shaft;
   c) a motor having a motor drive shaft; and
   d) a linkage member for transferring torque from said motor drive shaft to said sprockets.

2. The cutting apparatus of claim 1, further comprising:
   a) a second primary cutting disk assembly mounted to said vessel comprising:
      i) a second primary cutting disk having a front side and a back side and at least one bore extending through said disk, wherein said second primary cutting disk is rotatable about its central axis, and said first and second primary cutting disks are juxtaposed at oblique angles to each other;
      ii) a sprocket attached to said back side of said second primary cutting disk;
   b) at least one second ancillary cutting disk assembly rotatably mounted to said second primary cutting disk, wherein each of said at least one second ancillary cutting disk assembly comprises:
      i) a second ancillary cutting disk having a front side and a back side, wherein said second ancillary cutting disk does not extend beyond the outer circumference of said second primary cutting disk;
      ii) a shaft extending from the back side of said second ancillary cutting disk, wherein said shaft is rotatably received within said at least one bore of said second primary cutting disk; and
      iii) a sprocket attached to said shaft;
   c) a second motor having a motor drive shaft; and
   d) a linkage member for transferring torque from said second motor drive shaft to said sprockets.

3. The cutting apparatus of claim 2, further comprising a pivotal mounting assembly for mounting said first and second primary cutting disks to said vessel.

4. The cutting apparatus of claim 3, wherein said first and second primary cutting disks can be selectively positioned between a first position above a water surface and a second partially submerged position.

5. The cutting apparatus of claim 2, further comprising a plurality of substantially triangular cutting blades disposed on said second primary and second ancillary cutting disks.

6. The cutting apparatus of claim 1, further comprising a plurality of substantially triangular cutting blades disposed on said primary and ancillary cutting disks.

7. The cutting apparatus of claim 1, wherein said linkage members comprise chains.

* * * * *